United States Patent
Giebel et al.

(10) Patent No.: US 8,967,478 B2
(45) Date of Patent: Mar. 3, 2015

(54) APPARATUS FOR AND METHOD OF ELECTRO-OPTICALLY READING A TARGET IN THE PRESENCE OF AMBIENT LIGHT BY REJECTING THE AMBIENT LIGHT

(71) Applicant: Symbol Technologies, Inc., Schaumburg, IL (US)

(72) Inventors: James R. Giebel, Centerport, NY (US); Peter Fazekas, Bayport, NY (US); David P. Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 13/895,670

(22) Filed: May 16, 2013

(65) Prior Publication Data
US 2014/0339311 A1    Nov. 20, 2014

(51) Int. Cl.
*G06K 7/10* (2006.01)
*G06K 7/14* (2006.01)

(52) U.S. Cl.
CPC ................................. *G06K 7/146* (2013.01)
USPC ................. 235/455; 235/462.06; 235/462.24; 235/462.26

(58) Field of Classification Search
CPC . G06K 7/10; G06K 7/10693; G06K 7/10811; G06K 7/10851; G06K 7/14; G07G 1/0054
USPC .......... 235/455, 375, 462.11, 462.24, 462.29, 235/462.41, 462.26, 462.06
See application file for complete search history.

(56) References Cited

U.S. PATENT DOCUMENTS

| | | | |
|---|---|---|---|
| 4,694,182 A | 9/1987 | Howard | |
| 5,561,283 A | 10/1996 | Dvorkis et al. | |
| 5,612,529 A | 3/1997 | Coleman | |
| 5,852,286 A | 12/1998 | Coleman | |
| 6,018,364 A | 1/2000 | Mangelsdorf | |
| 6,360,949 B1 | 3/2002 | Shepard et al. | |
| 7,267,283 B2 | 9/2007 | Schneider et al. | |
| 7,441,703 B2 | 10/2008 | Moon et al. | |
| 7,446,806 B2 | 11/2008 | Carlson | |
| 8,028,917 B2 | 10/2011 | Giebel | |

(Continued)

FOREIGN PATENT DOCUMENTS

EP    0 364 676 A2    4/1990

OTHER PUBLICATIONS

Notice of Allowance mailed Sep. 23, 2014 in U.S. Appl. No. 14/050,027, Gary G. Schneider et al., filed Oct. 9, 2013.

*Primary Examiner* — Edwyn Labaze
(74) *Attorney, Agent, or Firm* — Nong-Qiang Fan

(57) ABSTRACT

A reader for electro-optically reading a target in the presence of ambient light to be rejected, includes a laser for emitting a laser beam, a scan component for scanning the laser beam over a scan angle across the target, a photodetector for generating an output signal by detecting return laser light from the target to generate an information signal bearing information related to the target, and by concomitantly detecting the ambient light to generate an ambient light signal, and signal processing circuitry for measuring the ambient light signal to determine a threshold, for processing the output signal by passing the output signal through a filter having a bandwidth, and for rejecting the ambient light signal from the output signal by adjusting the scan angle and/or the bandwidth when the ambient light signal exceeds the threshold.

19 Claims, 5 Drawing Sheets

(56) References Cited

U.S. PATENT DOCUMENTS

| | | |
|---|---|---|
| 8,063,964 B2 | 11/2011 | Kozlowski |
| 8,081,243 B2 | 12/2011 | Chou |
| 8,087,589 B2 | 1/2012 | Heinrich et al. |
| 2002/0117547 A1* | 8/2002 | Krichever ................ 235/462.01 |
| 2005/0141069 A1 | 6/2005 | Wood et al. |
| 2007/0063048 A1 | 3/2007 | Havens et al. |
| 2007/0069027 A1 | 3/2007 | Madej |
| 2009/0084853 A1 | 4/2009 | Giebel et al. |

* cited by examiner

APPARATUS FOR AND METHOD OF ELECTRO-OPTICALLY READING A TARGET IN THE PRESENCE OF AMBIENT LIGHT BY REJECTING THE AMBIENT LIGHT

FIELD OF THE DISCLOSURE

The present disclosure relates generally to an apparatus for, and a method of, electro-optically reading a target in the presence of ambient light and, more particularly, to rejecting the ambient light, especially when emitted from fluorescent lamps and light emitting diodes (LEDs) operated at kilohertz frequencies.

BACKGROUND

Moving laser beam readers or laser scanners have long been used as data capture devices to electro-optically read targets, such as one-dimensional bar code symbols, particularly of the Universal Product Code (UPC) type, printed on labels associated with products in many venues, such as supermarkets, warehouse clubs, department stores, and other kinds of retailers, as well as many other venues, such as libraries and factories. The moving laser beam reader generally includes a housing, a laser for emitting a laser beam, a focusing lens assembly for focusing the laser beam to form a beam spot having a certain size at a focal plane in a range of working distances relative to the housing, a scan component for repetitively scanning the beam spot over a scan angle across a target in a scan pattern, for example, a scan line or a series of scan lines, across the target multiple times per second, and a photodetector for detecting return light reflected and/or scattered from the target and for converting the detected return light into an analog electrical information signal bearing information related to the target. This analog electrical information signal varies in amplitude as a function of time due to the time-varying return light along each scan line, and varies in frequency as a function of the density of the symbol, as well as the distance at which the symbol is being read. The moving laser beam reader also includes signal processing receiver circuitry including a digitizer for digitizing the variable analog information signal, and a microprocessor for decoding the digitized signal based upon a specific symbology used for the target. The decoded signal identifies the product and is transmitted to a host, e.g., a cash register in a retail venue, for further processing, e.g., product price look-up or product inventorying.

In one advantageous embodiment, during operation of the moving laser beam reader in a venue having one or more external light sources that emit ambient light, an operator holds the housing in his or her hand, and aims the housing at the target, and then initiates the data capture and the reading of the target by manual actuation of a trigger on the housing. The ambient light is also concomitantly detected by the photodetector, which generates an analog electrical ambient light signal. In the event that the external source is sunlight, then the ambient light is substantially constant in magnitude, and therefore, the analog electrical ambient light signal has a constant illumination DC component. In the event that the external source is an incandescent bulb or a fluorescent lamp energized at 50 Hz or 60 Hz, then the analog electrical ambient light signal has a constant illumination DC component and a relatively small time-varying AC frequency component at 50 Hz or 60 Hz. In the event that the fluorescent lamp is operated at higher frequencies for greater luminous efficiency, or in the event that the external source includes light emitting diodes (LEDs) operated at higher frequencies, then the analog electrical ambient light signal has a constant illumination DC component and a relatively larger time-varying AC frequency component at kilohertz frequencies, typically anywhere from 30 kHz to 300 kHz.

In some circumstances, the presence of the ambient light signal interferes with, and weakens, the information signal. To prevent such interference, the constant illumination DC component of the ambient light signal can generally be filtered out from the information signal. Also, filters can be used to suppress the ambient light signal when its time-varying frequency component is very far in frequency away from the frequency of the information signal. However, if the time-varying frequency component of the ambient light signal is too close in frequency to the frequency of the information signal, then the ambient light signal can interfere and impede the decoding of the information signal, thus degrading the performance of the reader. By way of non-limiting example, an information signal of about 50 kHz and its harmonic at about 100 kHz can be generated during reading of a low density symbol located relatively close to the reader, e.g., about 10 inches away. If the ambient light source includes LEDs operated to have a frequency of about 100 kHz, then the 100 kHz frequencies of the ambient light signal and the information signal are too close and will cause an interference, and perhaps cause the symbol not to be successfully decoded and read.

Accordingly, there is a need to reject such interference caused by such ambient light to enhance reader performance.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
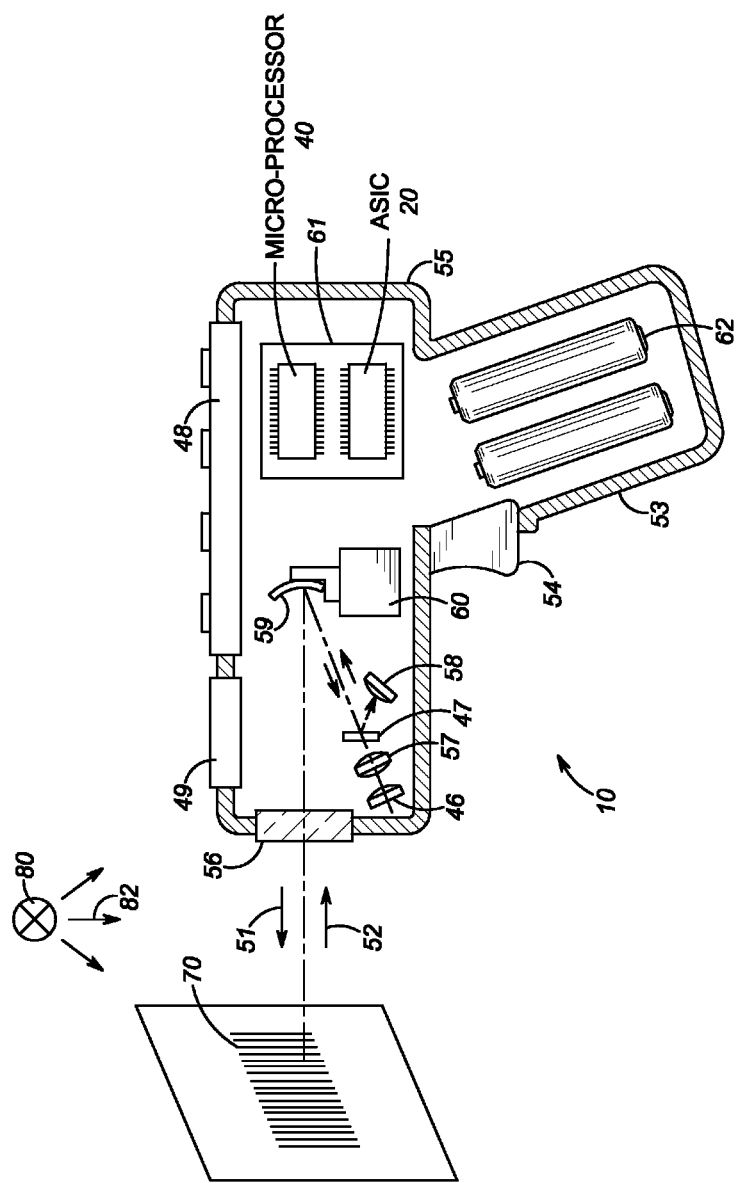
FIG. 1 is a schematic view of a handheld moving laser beam reader apparatus operative for rejecting an ambient light signal in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a reader for electro-optically reading a target, e.g., a bar code symbol, in the presence of ambient light to be rejected. The reader includes a laser, typically a semiconductor laser diode, for emitting a laser beam. The reader also includes a scan component for scanning the laser beam over an adjustable scan angle across the target for reflection and scattering therefrom as return laser light. The reader also includes a photodetector for generating an output signal by detecting the return laser light from the target to convert the detected return laser light into an analog electrical information signal bearing information related to the target, and by concomitantly detecting the ambient light to convert the detected ambient light into an analog electrical ambient light signal. The reader further includes signal processing circuitry for processing the output signal and including a controller, e.g., a microprocessor, for measuring the ambient light signal to determine a threshold, and a filter having an adjustable bandwidth. The signal processing circuitry is operative for rejecting the ambient light signal from the output signal by adjusting at least one of the scan angle and the bandwidth when the ambient light signal exceeds the threshold.

Advantageously, the controller is operative for energizing the laser between an energized state and a deenergized state, and the measuring of the ambient light signal is performed in the deenergized state of the laser. This can occur either prior to a reading session during a setup or calibration mode, and/or at periodic intervals during the reading session. For example, in the latter case, the laser can be deenergized for a short interval, e.g., 1 ms, in the center, or any other part, of a scan, once every twenty scans, or so. The controller is also operative for moving the scan component to sweep the laser beam over the scan angle in a scan, and the measuring of the ambient light signal may be performed prior to moving the scan component.

The controller is operative for reducing the scan angle of the scan component to lower a frequency of the information signal as compared to a higher frequency of the ambient light signal, and to move a cutoff frequency, and to reduce the bandwidth, of the filter so that the bandwidth does not encompass the higher frequency of the ambient light signal, thereby isolating and rejecting the ambient light signal.

A method, in accordance with another aspect of this disclosure, of electro-optically reading a target in the presence of ambient light to be rejected, is performed by emitting a laser beam; by scanning the laser beam over an adjustable scan angle across the target for reflection and scattering therefrom as return laser light; by generating an output signal by detecting the return laser light from the target to convert the detected return light into an analog electrical information signal bearing information related to the target, and by concomitantly detecting the ambient light to convert the detected ambient light into an analog electrical ambient light signal; by measuring the ambient light signal to determine a threshold; by processing the output signal by passing the output signal through a filter having an adjustable bandwidth; and by rejecting the ambient light signal from the output signal by adjusting at least one of the scan angle and the bandwidth when the ambient light signal exceeds the threshold.

Turning now to the drawings, FIG. 1 depicts a handheld, moving laser beam reader 10 implemented in a gun-shaped housing 55 having a pistol-grip type of handle 53. The housing 55 contains a laser light source 46, preferably a semiconductor laser diode, for emitting an outgoing laser beam 51 to a target, such as a bar code symbol 70, for reflection and scattering therefrom; a photodetector 58, preferably a photodiode, for detecting incoming light 52; a focusing optical assembly 57, preferably one or more focusing lenses, for focusing the outgoing laser beam 51 as a beam spot on the symbol 70; an application specific integrated circuit (ASIC) 20 mounted on a printed circuit board (PCB) 61; a programmed microprocessor or controller 40, also preferably mounted on the PCB 61; and a power source or battery 62, preferably mounted in the handle 53. A light-transmissive window 56 at a front end of the housing 55 allows the outgoing laser light beam 51 to exit the housing 55, and the incoming light 52 to enter the housing 55. A user holds the reader 10 by the handle 53, and aims the reader 10 at the symbol 70, preferably at a distance away from the symbol 70. To initiate reading, the user pulls a trigger 54 on the handle 53. The reader 10 may optionally include a keyboard 48 and a display 49 readily accessible to the user.

As further depicted in FIG. 1, the laser beam 51 emitted by the laser light source 46 passes through a partially-silvered mirror 47 to a scan component or oscillating scan mirror 59, which is coupled to a drive motor 60, preferably energized when the trigger 54 is manually pulled. The oscillation of the mirror 59 causes the outgoing laser beam 51 to sweep back and forth over a scan angle in a desired scan pattern, e.g., a scan line, across the symbol 70. A variety of mirror and motor configurations can be used to move the laser beam in the desired scan pattern. For example, the mirror 59 need not be a concave mirror as illustrated, but could be a planar mirror that is repetitively and reciprocally driven in alternate circumferential directions over a scan angle about a drive shaft on which the planar mirror is mounted. By way of non-limiting numerical example, the scan angle can be on the order of 50 degrees during a default mode of operation.

As further depicted in FIG. 1, the incoming light 52 may have two light components that come from two different sources. The first light component is return laser light derived from the laser light source 46 and is generated by reflection and/or scattering of the laser light beam 51 back by the symbol 70 through the window 56. The second light component is ambient light 82 derived from an external ambient light source 80 operative for emitting the ambient light 82. As described above, the external light source 80 at a venue can be sunlight, one or more incandescent bulbs, one or more fluorescent lamps, one or more light emitting diodes (LEDs), and the like. In the exemplary reader 10 shown in FIG. 1, the incoming light 52 reflects off of the scan mirror 59 and the partially-silvered mirror 47 and impinges on the detector 58. The detector 58 produces an analog electrical output signal ($V_{OUT}$) proportional to the intensity of the return light 52. A first component signal of the output signal $V_{OUT}$ of the return light 52 that is returned from the symbol 70 and that is derived from the laser light from the laser light source 46 is hereinafter described as an "information" signal ($V_{ABP}$) bearing information related to the symbol 70. The subscript ABP is an abbreviation for analog bar pattern. A second component signal of the output signal $V_{OUT}$ of the return light 52 that is derived from the ambient light source 80 is hereinafter described as an "ambient light" or "interfering" signal ($V_{AMB}$).

Figure 3:
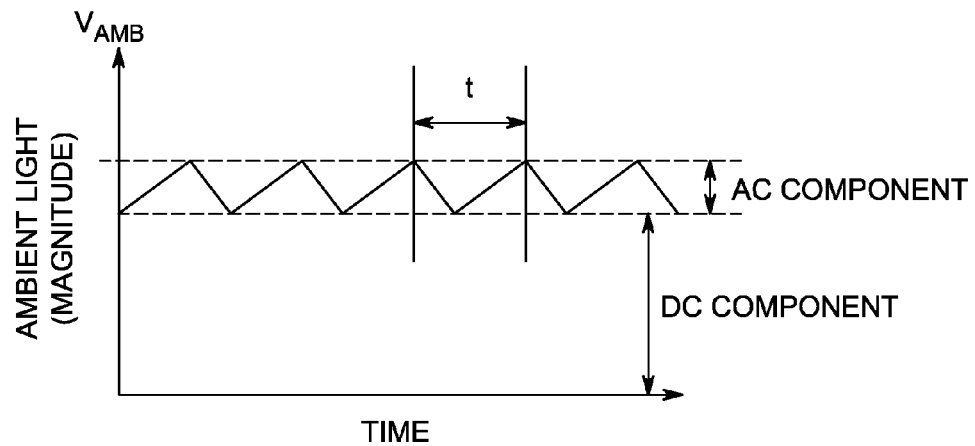
FIG. 3 is a magnitude-versus-time graph depicting characteristics of an ambient light signal to be rejected.
Figure 4:
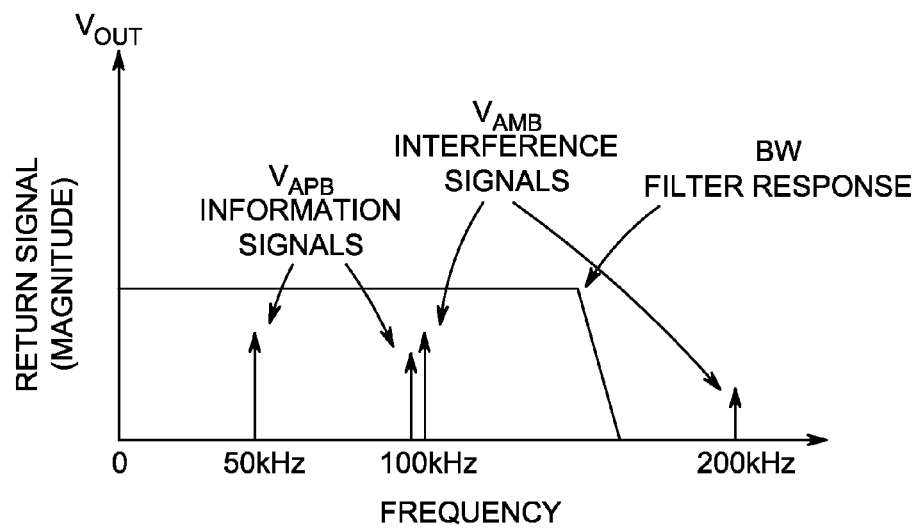
FIG. 4 is a magnitude-versus-frequency graph of a return signal depicting interference between information signals and ambient light signals.

As also described above, when fluorescent lamps and LEDs are operated at kilohertz frequencies, then, as best shown in FIG. 3, the analog electrical ambient light signal $V_{AMB}$ has a constant illumination DC component and a relatively large time-varying AC frequency component at kilohertz frequencies, typically anywhere from 30 kHz to 300 kHz. There are circumstances where the time-varying frequency component of the ambient light signal $V_{AMB}$ is too close in frequency to the frequency of the information signal $V_{ABP}$, in which event the ambient light signal $V_{AMB}$ can interfere and impede the decoding of the information signal $V_{ABP}$, thus degrading the performance of the reader 10. By way of non-limiting example, as illustrated in FIG. 4, an information signal $V_{ABP}$ of about 50 kHz and its harmonic of about 100 kHz can be generated during reading of a low density symbol 70 located relatively close to the reader 10, e.g., about 10 inches away. If the LEDs are operated at about 100 kHz, then ambient light signal $V_{AMB}$ will have a frequency of about 100 kHz and its harmonic will have a frequency of about 200 kHz. The 100 kHz frequencies of the ambient light signal $V_{AMB}$ and the information signal $V_{ABP}$ are too close and will cause an interference, and perhaps cause the symbol 70 not to be successfully read. One aspect of this disclosure is to reject such interference.

Figure 2:
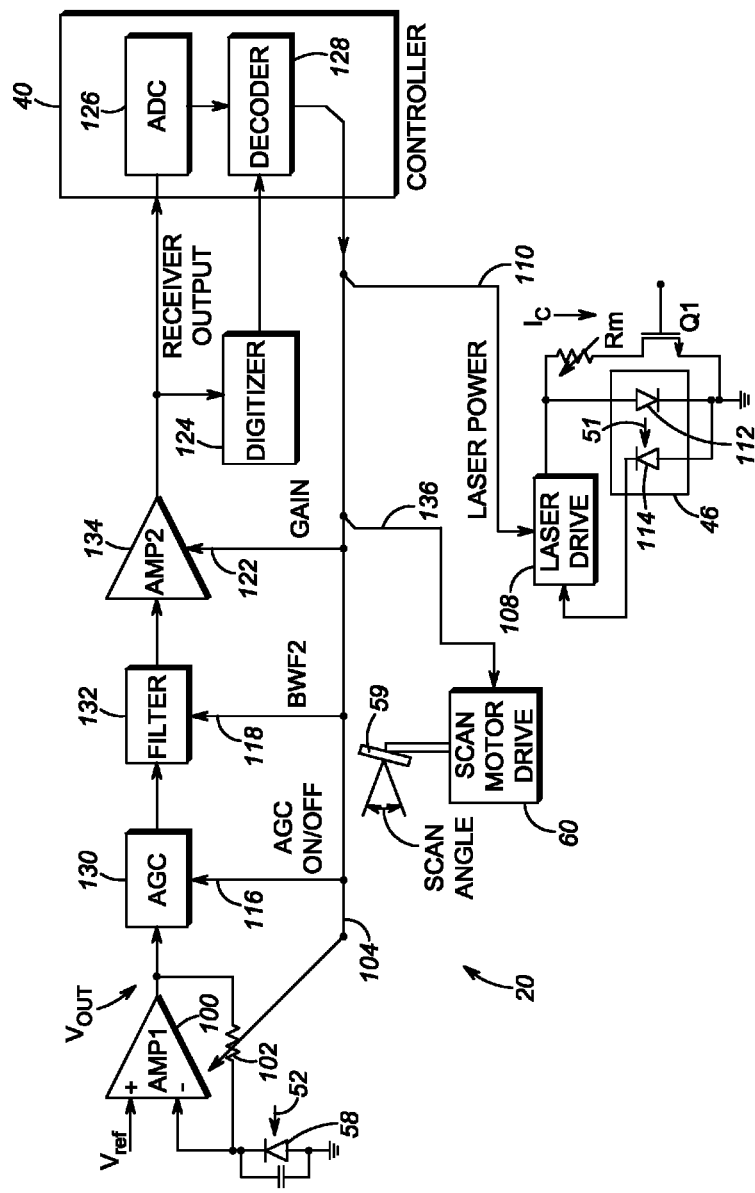
FIG. 2 is an electrical circuit schematic of a signal processing receiver circuit for use in the apparatus of FIG. 1.

The ASIC 20, as shown in the embodiment of FIG. 2, includes a signal processing receiver circuit connected to the photodetector 58, which, as described above, outputs the output signal $V_{OUT}$. The signal processing receiver circuit includes at least one amplifier (AMP1) 100, advantageously configured as a transimpedance amplifier, to increase the gain of the analog electrical output signal $V_{OUT}$ received from the photodetector 58. The gain of the amplifier AMP1 can be adjusted by varying a resistor 102 via a control line 104 connected to the controller 40. The output signal $V_{OUT}$ is conducted to an automatic gain controller 130 (AGC) having an on/off control input under the control of the microprocessor 40 over control line 116, at least one active low-pass filter 132 having an adjustable bandwidth (BW) under the control of the microprocessor 40 over control line 118, and at least one amplifier 134 (AMP2) having an adjustable gain to increase the gain of the output signal under the control of the microprocessor 40 over control line 122.

The signal processing receiver circuit also includes a digitizer 124 which digitizes the output signal from the amplifier 134 by processing the output signal with differentiating circuits, peak detectors, multiplexers, logic elements, and comparators. The digitizer 124 processes the output signal to produce a pulse signal where the widths and spacings between the pulses correspond to the widths of the bars and the spacings between the bars of the symbol 70. The digitizer 124 serves as an edge detector or wave shaper circuit, and threshold points set by the digitizer 124 determines what points of the output signal represent bar edges. The pulse signal from the digitizer 124 is applied to a decoder 128, typically incorporated as software in the programmed controller 40, which will also have associated program memory and random access data memory. The controller 40 also has an analog-to-digital converter (ADC) 126 connected to the decoder 128 and to the output of the amplifier 134. The decoder 128 first determines the pulse widths and spacings of the output signal from the digitizer 124. The decoder 128 then analyzes the widths and spacings to find and decode a legitimate bar code symbol. This includes analysis to recognize legitimate characters and sequences, as defined by the appropriate code standard or symbology. The controller 40 then communicates with an external host over an interface.

As shown in FIG. 2, the controller 40 also controls the laser light source 46 with a laser drive circuit 108 via a control line 110. The laser drive circuit 108 includes a laser power regulator, which is a closed loop feedback system that maintains a constant optical output power by varying the applied forward current $I_C$ to the laser light source 46. The laser light source 46 includes a laser diode 112 and a monitor photodiode 114. A small fraction of the output laser light is coupled into the monitor photodiode 114 within the enclosed laser light source 46. This induces a photocurrent in the monitor photodiode 114 that is proportional to the laser output power. This photocurrent is a negative feedback signal that is used to regulate the laser's output power. Thus, the controller 40 can either turn the laser light source 46 on to an energized state, or turn the laser light source 46 off to a deenergized state. In the energized state, the laser light source 46 can either be continuously energized, or pulsed or modulated with the laser drive circuit 108 via the control line 110 so that a modulated current is conducted to the laser light source 46. The laser light source 46 is typically pulsed at a rate or frequency sufficiently fast to accurately resolve the narrowest bar or space used in the type of bar code symbol 70 to be read. Typically, this amounts to several pulses during the period of time required for the scanning laser beam to scan across the narrowest bar or space of the bar code symbol 70. If the laser light source 46 is pulsed, then a demodulator (not illustrated) is advantageously provided in the receiver, preferably between the amplifier 100 and the AGC 130.

As also shown in FIG. 2, the controller 40 also controls the drive motor 60 over a control line 136. The drive motor 60 sweeps the scan component or oscillating scan mirror 59 over a scan angle, which, as noted above, can be about 50 degrees in a default mode of operation.

As noted above, the output signal $V_{OUT}$ received from the photodetector 58 has two components: the information signal $V_{ABP}$ and the ambient light signal $V_{AMB}$. When the laser light source 46 is in the energized state, then the output signal $V_{OUT}$ is the sum of the information signal and the ambient light signal ($V_{ABP}+V_{AMB}$). When the laser light source is in the deenergized state, then the output signal $V_{OUT}$ is just the ambient light signal $V_{AMB}$ ($V_{ABP}=0$).

The measurement of the ambient light signal $V_{AMB}$ can be performed by the controller 40 in various ways, for example, in the deenergized state of the laser light source 46, or prior to moving the scan component 59, as described below. If the measured ambient light signal $V_{AMB}$ is at a threshold value, for example, at or near zero, then the presence of the ambient light signal $V_{AMB}$ can be tolerated and, hence, the output signal ($V_{ABP}+V_{AMB}$) is sent downstream to the AGC 130 for further processing, and it is not necessary to actively reject the ambient light signal $V_{AMB}$. If the measured ambient light signal $V_{AMB}$ exceeds the threshold value, then the presence of the ambient light signal $V_{AMB}$ will interfere with the reading of the symbol 70 and, hence, it is necessary to actively reject the ambient light signal $V_{AMB}$.

The threshold or reference value may be determined by measuring a magnitude and/or a frequency of the ambient light signal $V_{AMB}$. For example, the controller 40 can turn the laser light source 46 off in the deenergized state, either prior to a reading session during a setup or calibration mode, and/or at periodic intervals during the reading session. For example, in the latter case, the laser light source 46 can be deenergized for a short interval, e.g., 1 ms, in the center, or any other part, of a scan, once every twenty scans, or so. In the deenergized state, the gain of the amplifiers AMP1 and AMP2 are fixed, and the AGC 130 is turned off.

As described above, the controller 40 moves the scan component 59 to sweep the laser beam over the scan angle in a scan. The measuring of the magnitude of the ambient light signal can also be performed in the calibration mode prior to moving the scan component 59. In addition, the controller 40 can measure the frequency of the ambient light signal by executing a fast Fourier transform (FFT) on the ambient light signal. Alternatively, this threshold value can be stored in advance in a memory of the controller 40.

Figure 5:
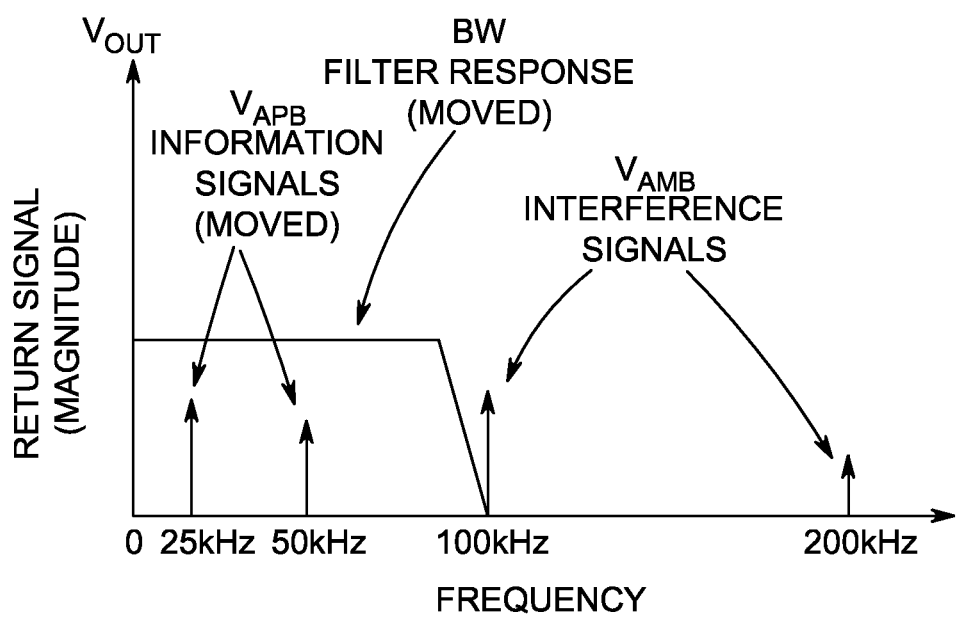
FIG. 5 is a graph analogous to FIG. 4, but diagrammatically showing how the ambient light signals are rejected.

When it is determined whether the measured ambient light signal exceeds the threshold, rejection of the ambient light signal $V_{AMB}$ is actively performed by reducing the scan angle and by lowering the cutoff frequency of the filter 132. When the controller 40 reduces the scan angle by half, for example, to about 25 degrees, then the frequency of the information signal is also halved. Thus, as shown in FIGS. 4-5, the information signal $V_{ABP}$ in FIG. 4 is about 50 kHz (and its harmonic is about 100 kHz) in the default mode of operation where the scan angle is about 50 degrees, whereas the information signal $V_{ABP}$ in FIG. 5 is about 25 kHz (and its harmonic is about 50 kHz) after the scan angle has been halved to about 25 degrees. Thus, the information signal $V_{ABP}$ and its harmonic have been moved away from the interfering ambient light signal $V_{AMB}$ and its harmonic.

Concomitantly or alternatively, the bandwidth BW of the filter 132 in FIG. 4 can be moved to baseband as shown in FIG. 5. The bandwidth BW in FIG. 4 encompasses both the information signal $V_{ABP}$ (and its harmonic), as well as the interfering ambient light signal. By lowering the cutoff frequency of the filter 132, the bandwidth BW in FIG. 5 encompasses only the information signal $V_{ABP}$ (and its harmonic). The ambient light signal and its harmonic are outside the bandwidth BW of the filter 132 in FIG. 5.

Figure 6:
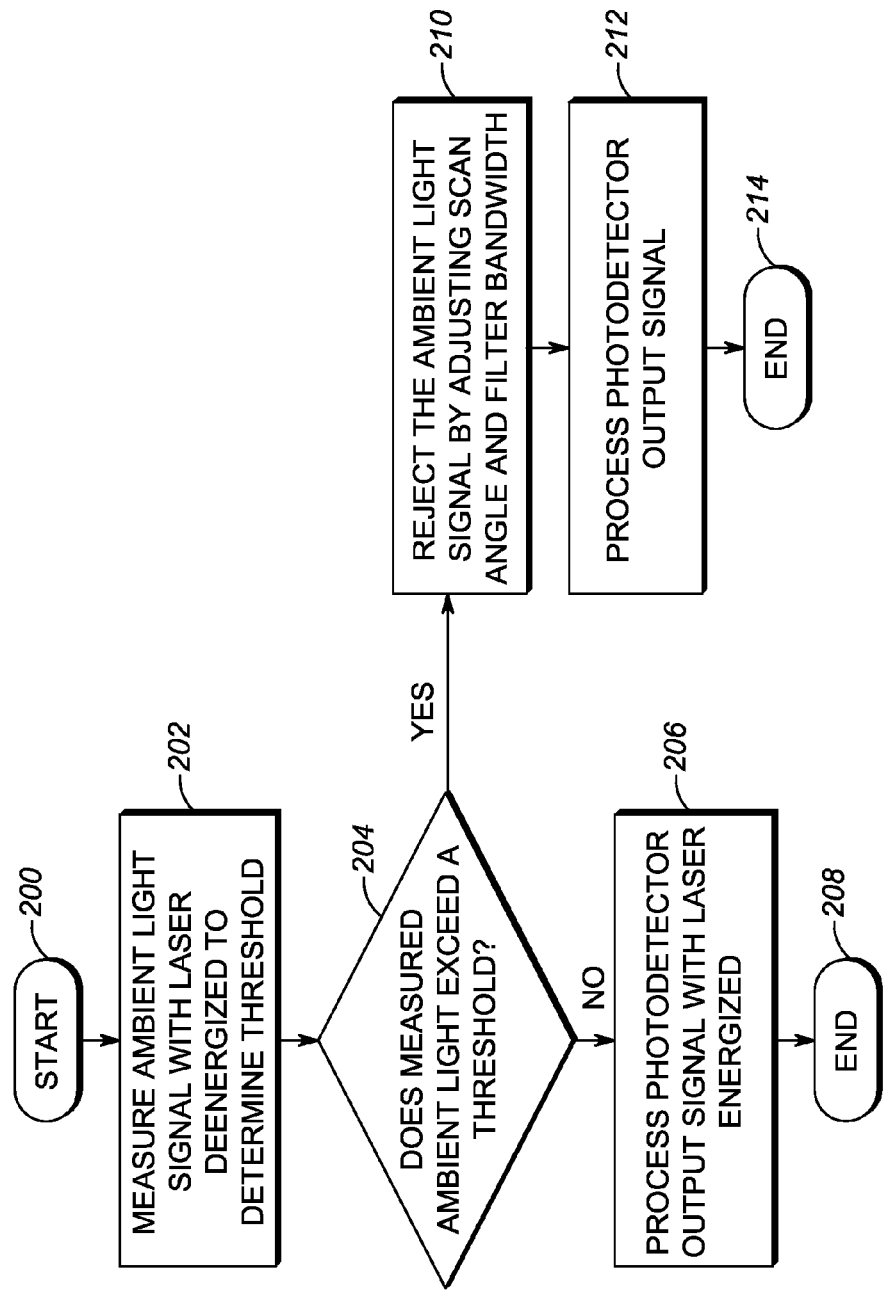
FIG. 6 is a flow chart depicting steps performed in rejecting the ambient light signals in accordance with the method of the present disclosure.

As depicted in the flow chart of FIG. 6, prior to or at the beginning of a reading session at start step 200, the laser light source 46 is deenergized, and the ambient light signal is measured to determine the threshold in step 202. Then, in step 204, it is determined whether the measured ambient light signal exceeds the threshold. If not, then the photodetector output signal is processed in step 206, and the reading session ends at step 208. If yes, then the ambient light signal is rejected by adjusting the scan angle and/or the bandwidth in step 210. Then, the photodetector output signal is processed in step 212, after which the reading session ends at step 214.

It will be understood that the output signal of the photodetector 58 is processed by default without adjusting the scan angle and/or the bandwidth. These adjustments are only made when they are needed, i.e., when the magnitude and/or frequency of the ambient light signal is too close to that of the information signal, and, therefore, cannot be ignored. The threshold value for the ambient light signal is, as described above, measured when the gain of the amplifiers AMP1 and AMP2 are fixed by the controller 40 over control lines 104, 122, and when the AGC 130 is turned off by the controller 40 over control line 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A reader for electro-optically reading a target in the presence of ambient light to be rejected, comprising:
   a laser for emitting a laser beam;
   a scan component for scanning the laser beam over an adjustable scan angle across the target for reflection and scattering therefrom as return laser light;
   a photodetector for generating an output signal by detecting the return laser light from the target to convert the detected return laser light into an analog electrical information signal bearing information related to the target, and by concomitantly detecting the ambient light to convert the detected ambient light into an analog electrical ambient light signal;
   signal processing circuitry for processing the output signal, the signal processing circuitry including a controller for measuring the ambient light signal to determine a threshold, and a filter having an adjustable bandwidth, the signal processing circuitry being operative for rejecting the ambient light signal from the output signal by adjusting at least one of the scan angle and the bandwidth when the ambient light signal exceeds the threshold; and
   wherein the signal processing circuitry further includes a digitizer that receives the output signal through the filter with adjustable bandwidth, the digitizer being configured to determine points in the output signal that represent bar edges of a symbol on the target.

2. The reader of claim 1, wherein the controller is operative for moving the scan component to sweep the laser beam over the scan angle in a scan, and wherein the controller is operative for measuring the ambient light signal prior to movement of the scan component.

3. The reader of claim 1, wherein the controller is operative for energizing the laser between an energized state and a deenergized state, and wherein the controller is operative for measuring the ambient light signal in the deenergized state of the laser.

4. The reader of claim 1, wherein the controller is operative for reducing the scan angle when the ambient light signal exceeds the threshold.

5. The reader of claim 1, wherein the controller is operative for lowering a cutoff frequency of the filter when the ambient light signal exceeds the threshold.

6. The reader of claim 1, wherein the signal processing circuitry includes an automatic gain circuit (AGC); and wherein the controller is operative for turning the AGC off when the threshold is being determined.

7. The reader of claim 1, wherein the signal processing circuitry includes at least one amplifier having a gain; and wherein the controller is operative for fixing the gain of the at least one amplifier when the threshold is being determined.

8. The reader of claim 1, wherein the controller is operative for measuring at least one of a magnitude and a frequency of the ambient light signal.

9. The reader of claim 1, wherein the digitizer is configured for digitizing the information signal to generate a digitized signal, and wherein the controller is operative for decoding the digitized signal.

10. A reader for electro-optically reading a target in the presence of ambient light to be rejected, comprising:
    a laser for emitting a laser beam;
    a scan component for scanning the laser beam over an adjustable scan angle across the target for reflection and scattering therefrom as return laser light;
    a photodetector for generating an output signal by detecting the return laser light from the target to convert the detected return laser light into an analog electrical information signal bearing information related to the target, and by concomitantly detecting the ambient light to convert the detected ambient light into an analog electrical ambient light signal;
    signal processing circuitry for processing the output signal, the signal processing circuitry including an automatic gain circuit (AGC), at least one amplifier having a gain, a filter having an adjustable bandwidth, and a controller for measuring the ambient light signal by turning the AGC off and by fixing the gain of the at least one amplifier to determine a threshold, the signal processing circuitry being operative for rejecting the ambient light signal from the output signal by adjusting at least one of the scan angle and the bandwidth when the ambient light signal exceeds the threshold; and
    wherein the signal processing circuitry further includes a digitizer that receives the output signal through the filter with adjustable bandwidth, the digitizer being configured to determine points in the output signal that represent bar edges of a symbol on the target.

11. A method of electro-optically reading a target in the presence of ambient light to be rejected, comprising:
    emitting a laser beam from a laser;
    scanning the laser beam over an adjustable scan angle across the target for reflection and scattering therefrom as return laser light;
    generating an output signal by detecting the return laser light from the target to convert the detected return light into an analog electrical information signal bearing information related to the target, and by concomitantly detecting the ambient light to convert the detected ambient light into an analog electrical ambient light signal;
    measuring the ambient light signal to determine a threshold;
    processing the output signal by passing the output signal through a filter having an adjustable bandwidth to a digitizer configured to determine points in the output signal that represent bar edges of a symbol on the target; and
    rejecting the ambient light signal from the output signal by adjusting at least one of the scan angle and the bandwidth when the ambient light signal exceeds the threshold.

12. The method of claim 11, wherein the scanning is performed by moving a scan component to sweep the laser beam over the scan angle in a scan, and wherein the measuring of the ambient light signal is performed prior to moving the scan component.

13. The method of claim 11, and energizing the laser between an energized state and a deenergized state, and wherein the measuring of the ambient light signal is performed in the deenergized state of the laser.

14. The method of claim 11, and reducing the scan angle when the ambient light signal exceeds the threshold.

15. The method of claim 11, and lowering a cutoff frequency of the filter when the ambient light signal exceeds the threshold.

16. The method of claim 11, and turning an automatic gain circuit (AGC) off when the threshold is being determined.

17. The method of claim 11, wherein the processing of the output signal is performed by passing the output signal through at least one amplifier having a gain; and
fixing the gain of the at least one amplifier when the threshold is being determined.

18. The method of claim 11, wherein the measuring of the ambient light signal is performed by measuring at least one of a magnitude and a frequency of the ambient light signal.

19. The method of claim 11, and digitizing the information signal to generate a digitized signal, and decoding the digitized signal.

\* \* \* \* \*